INVENTOR
Charles D Richard

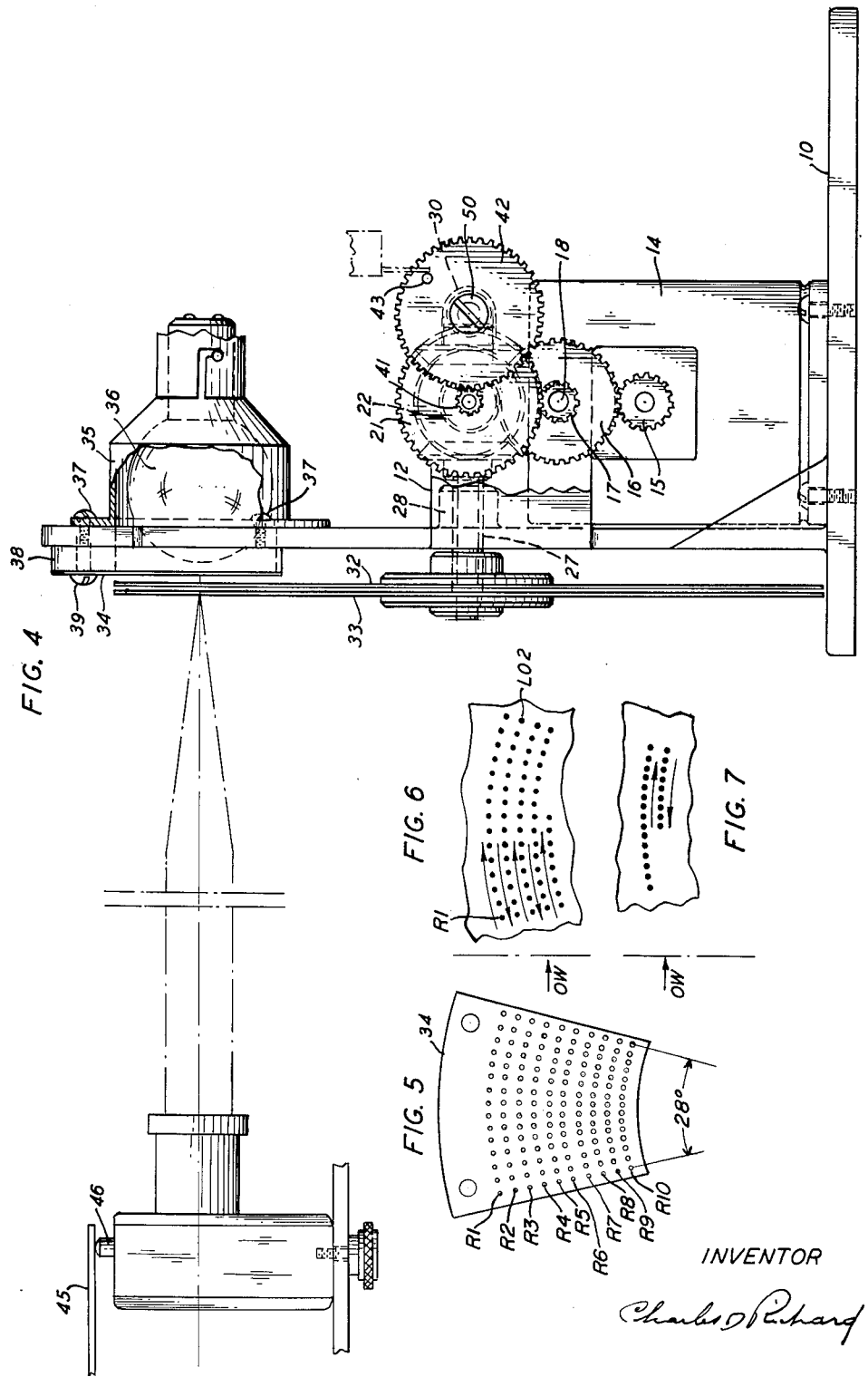

United States Patent Office 3,085,846
Patented Apr. 16, 1963

3,085,846
DEVICE FOR RECORDING THE SPEED OF SHUTTERS IN PHOTOGRAPHIC AND THE LIKE APPARATUS
Charles D. Richard, 25 E. Craig St., Basking Ridge, N.J.
Filed Mar. 26, 1962, Ser. No. 182,504
7 Claims. (Cl. 346—108)

This invention has reference to a device for recording the speed of shutters in photographic and the like apparatus.

It is an improvement over a shutter speed recording device disclosed in Patent No. 3,046,555, issued July 24, 1962 in the names of Charles D. Richard and Arthur W. Ziegler.

In the device disclosed in that patent, a belt is mounted on two sprocket wheels for movement adjacent a screen and a lamp disposed to one straight side portion of the belt, the belt having lightpaths disposed for successively registering with vertical rows of light openings in the screen for transmitting light dots onto a film in the photographic apparatus, the space or distance between the lightpaths in the belt being equal to, plus one lightpath to that contained in the vertically disposed rows of light openings in the screen.

While the speed recording of shutters in photographic apparatus, by the use of the device disclosed in the above mentioned patent, has been found to be satisfactory as far as the recording of shutters which open and close on the center line of the lens, the use of such device has not been found convenient for recording the speed of focal plane shutters in which, as one of the drawbacks, necessitates the holding of the recording device and the photographic apparatus at a definite angle to each other, with the consequent recording of the light dots onto the film in an oblique relation, resulting in a number of light dots thus recorded being partially eclipsed both at the beginning and ending of each recording operation, thus making the reading of such recording on the film most difficult and liable of inaccuracies.

Another drawback in the speed recording of focal plane shutters in photographic apparatus by the use of the device disclosed in that co-pending patent application, is the fact that two recording operations are necessary for obtaining an indication of the speed record of a shutter, one of such recording operations being effected with the movement of the belt in one direction, which has the effect of partially negativing the speed of the shutter, while the second recording operation is effected with the movement of the belt in opposite direction to the first recording operation, which has the effect of increasing the speed of the shutter proportionally to that negativated by the first recording speed operation, these two recording operations requiring the counting of only the fully formed recorded light dots and omitting the numbers of the partially formed dots appearing at the beginning and ending of each of these two recording operations because of the angle formed by the recording device and the photographic apparatus, the proper formed light dots being then divided by two so as to obtain an average number of light dots which represents the speed of the shutter thus recorded.

The object of the present invention is the provision of a shutter speed recording device in which the drawbacks pointed out in connection with the device disclosed in the patent above mentioned, are effectively eliminated while providing a device which is accurate in operation, simple in construction, cheap to manufacture, and which may be used efficiently by an unskilled operator for the recording on a film the speed of any type of shutters in photographic and other high speed operating devices as, for example, focal plane shutters.

The novel features of the present invention will clearly appear from the following description and by the claims appended thereto, reference being had to the accompanying drawing in which:

FIG. 4 is a right side elevation view of the device showing the position of a lamp and a screen plate relative to the disc members;

FIG. 5 is a front view of the screen plate;

FIG. 6 is a partial view of a film showing a shutter speed record effected by the operation of the recording device of the present invention, the recording operation being shown terminating with the rotation of one of the disc members in the direction of movement of the shutter;

FIG. 7 is another partial view of the film showing a recording operation terminating in direction opposite to that of the shutter.

Figure 2:
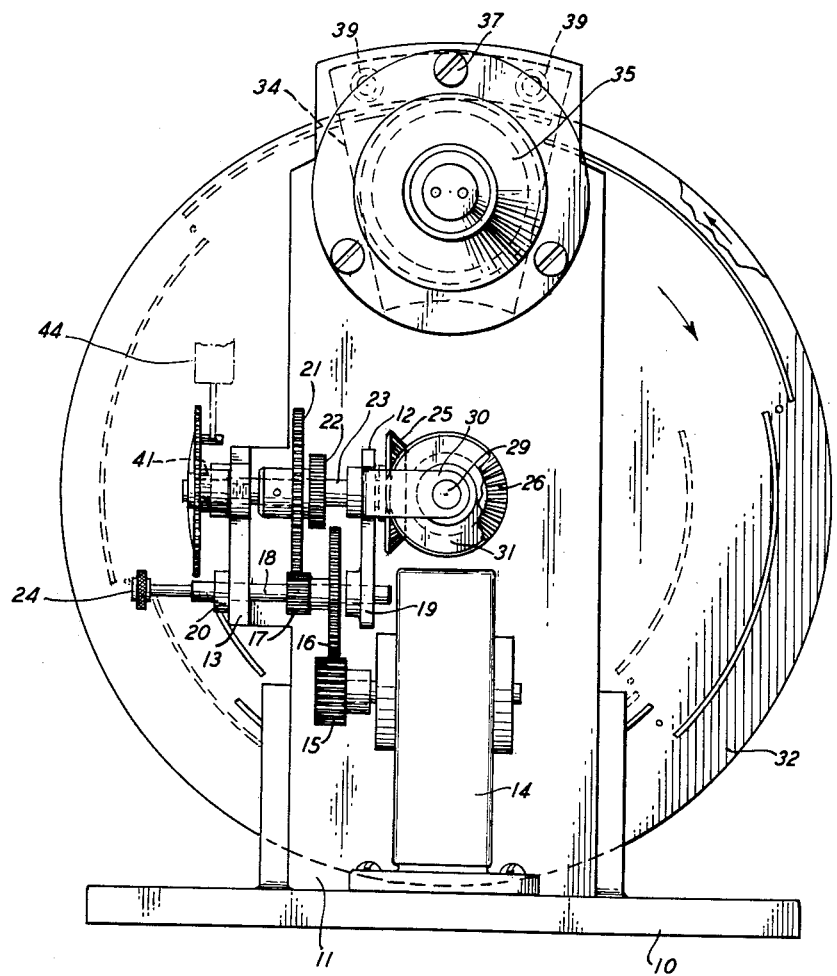
FIG. 2 is a rear assembly view showing the gearing mechanism for selectively actuating a pair of cooperating disc members at different speed collectively.
Figure 3:
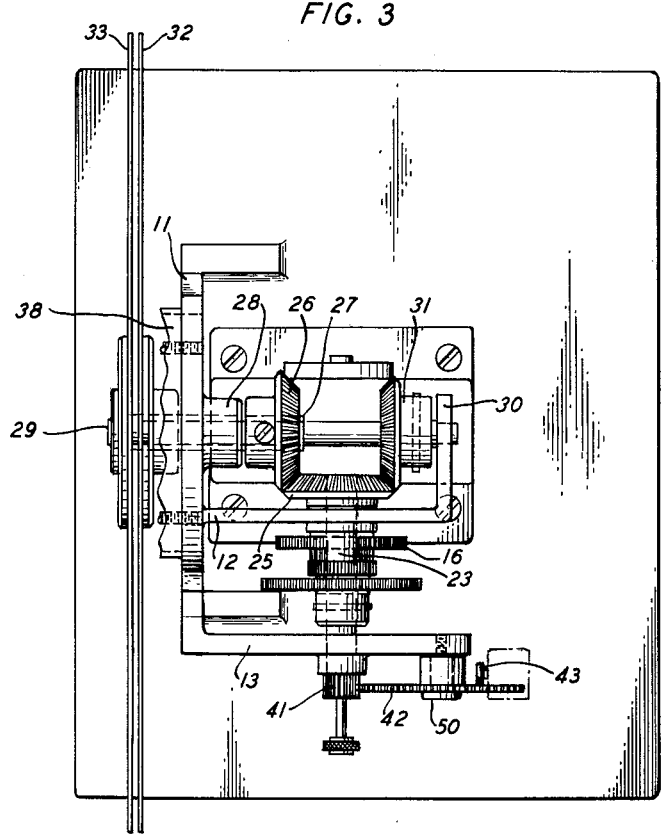
FIG. 3 is a plan view showing the differential gear mechanism for actuating the disc members in opposite direction to each other.

The shutter speed recording device of the present invention, as shown through the several views of the drawing, consists of a base 10 formed with an upright disposed plate 11, cast with two flange members 12 and 13, best seen in FIGS. 2 and 3, and on the base 10 is securely mounted a constant speed motor 14 operating at a speed of 1800 revolutions per minute. On the armature shaft of motor 14 is keyed a pinion 15 which meshes with a gear 16 formed as a unit with a pinion 17, such gear pinion unit being keyed onto a shaft 18 arranged for rotation and axial movement into the bearings 19 and 20 formed with the flange members 12 and 13 respectively.

Pinion 17 meshes with a gear 21 formed as a unit with a pinion 22 keyed to a shaft 23, mounted for rotation in bearing formed with the flange members 12 and 13, the shaft 18, together with the gear pinion unit 16—17, may be moved in position for disengaging pinion 17 from gear 21 while engaging the gear 16 with pinion 22, which movement may be effected manually by a knob 24 carried by shaft 18.

On one end of shaft 23, FIGS. 2 and 3, is keyed an angle gear 25 meshing with an angle gear 26, secured onto one end of a sleeve 27, FIGS. 3 and 4, rotatably mounted into a bearing 28 formed with the upright plate 11, and in sleeve 27 is rotatably mounted one end of a shaft 29 while the opposite end of this shaft is fitted for rotation in a lug portion 30 extending at right angle from flange member 12. Adjacent to this end of shaft 29 is keyed an angle gear 31 which is similar to gear 26 on sleeve 27, the gears 25, 26 and 31 forming a gear differential mechanism provided to perform a function which will be hereafter described in detail.

On the outer disposed end of sleeve 27, which protrudes to the front side of plate 11, is securely mounted a disc member 32, while on the outer end of shaft 29 is securely mounted a disc member 33 disposed in close relation flatwise to disc member 32, FIGS. 3 and 4, the discs 32 and 33 being rotated in direction opposite to each other upon the operation of the gear differential mechanism formed by the angle gears 25—26 and 31 above mentioned.

Figure 1:
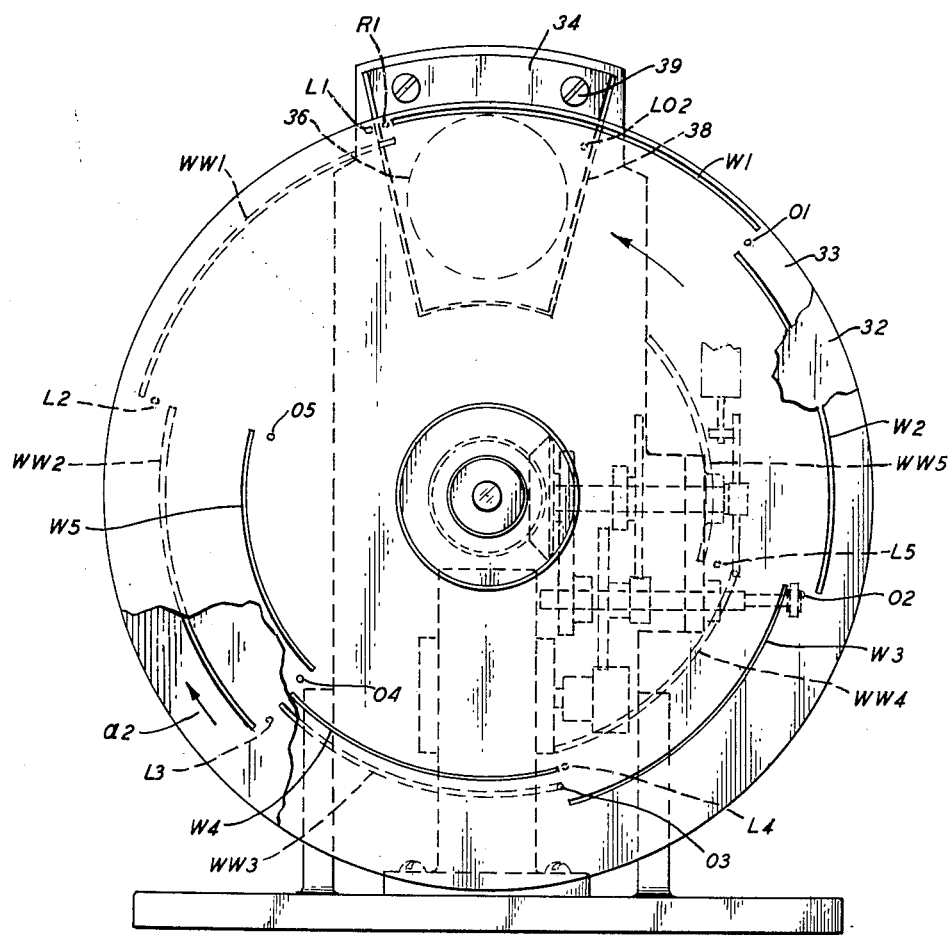
FIG. 1 is a front elevation view of the shutter speed recording device of this invention, shown with a number of operating parts, with portions broken away.

To the top disposed front end portion of upright plate 11, as best seen in FIGS. 1, 3 and 4, is formed a rim 38, to the face of which is securely held, as by screws 39, a sector-shaped screen plate 34, FIGS. 1, 4 and 5, disposed radially with reference to the center of the discs 32—33, while to the back or opposite side of upright plate 11 is mounted a light reflector 35 fitted with a lamp 36 which projects into an opening in the upright plate 11 in position adjacent to the rear side of the screen plate 34, the reflector 35 being secured to the upright plate 11 by a plurality of similar screws 37.

The sector-shaped screen plate 34, as best seen in FIG. 5, is provided with ten concentrically disposed rows of holes, each row having fifteen holes disposed at equal angle distance 2° apart in each row, thereby forming fifteen radial lines with reference to the center of discs 32 and 33. The concentric rows of holes in the screen plate are disposed radially to coincide with corresponding holes and arcuate slots forming light paths in the disc members 32—33 positioned to register with the concentric rows of holes in the screen plate 34 upon the rotation of the disc members for a purpose which will be hereinafter described in detail.

The screen plate 34 may be provided with any number of concentric rows of holes, and the discs may be of any diameter having any number of arcuate slots and holes corresponding to the number of concentric rows of holes in the screen plate, depending upon the speed of shutters to be recorded. The diameter of the holes in the screen plate, the holes in the discs and the width of the arcuate slots are in the present construction .020 of an inch.

Disc member 33, as best seen in FIG. 1, is provided with five equally spaced arcuate slots W1, W2, W3, W4 and W5, disposed at equal angle distance of 60°, but each of different radius from the center of the disc. Similarly, disc member 32 is provided with five arcuate slots WW1, WW2, WW3, WW4 and WW5, of equal angle distance of 60° but of different radius from the center of the disc.

The radius of the arcuate slot W1 in disc 33, for example, which rotates counter clockwise, as indicated by the arrow, is equal to the radius forming the row of holes R in the screen plate 34, the radius of the arcuate slot WW1 in disc 32, which rotates clockwise, as indicated by the arrow a2, is equal to the radius forming the row of holes R1 in the screen plate, etc., again the radius of the arcuate slot WW5 in disc 32 is equal to the radius of the row of holes R10 in the screen plate 34.

Further, disc member 33 is provided with similar holes O1, O2, O3, O4 and O5, disposed at equal angle distance of 60° to each other. Similarly, disc member 32 is provided with holes L1, L2, L3, L4 and L5, such holes in discs 32 and 33 having radius each corresponding to the width of respective arcuate slots in the other disc; for example, the hole L1, FIG. 1, in disc 32, has a radius corresponding to arcuate slot W1 in disc 33, hole L2 in disc 32 has a radius equal to the radius of arcuate slot W2 in disc 33.

Figure 8:
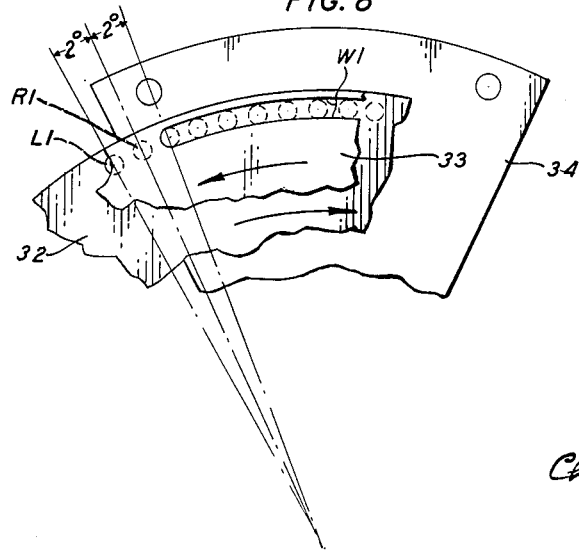
FIG. 8 is a fragmentary view of the screen plate and disc members in their operating relation, enlarged.

The hole L1 in disc 32 which rotates in a clockwise direction and the arcuate slot W1 in disc 33 will pass in registry with the hole R1, FIGS. 1, 5 and 8, of that concentric row in the screen plate 34 and successively in registry with the fourteen other holes in that row, thus producing on the film in the photographic apparatus an arcuate recorded row of light dots that is clockwise, as shown in FIG. 6, when the hole O1 in disc 33 is in position to pass in registering or concentric relation with hole LO2, FIG. 6, of the R2 second concentric row of holes in the screen plate when the arcuate slot WW2 in disc 32 will have moved clockwise to position this slot in registry with the hole O2 in disc 33 for recording the row of light dots R3 on the film, and this operation is continued to the end of the recording operation which is terminated upon the passing of the hole O5, FIG. 1, in disc 33, in registry with the arcuate slot WW5 in disc 32 and successively in registry with the row of holes R10 having the shortest radius in the screen plate 34.

It is to be noted that according to the above description, the light emitted by the lamp passes through the hole R1 in the screen plate 34 and the consecutive holes in that row, upon the rotation of disc 32 through the arcuate slot W1 in disc 33 and hole L1 rotating in the opposite direction to the disc 33, but in the direction of the focal plane shutter, as indicated by the arrows OW—OW in FIGS. 6 and 7, which, as above mentioned, has the effect of negativing the movement of the shutter, this effect being compensated by the rotation of disc 33 moving counter-clockwise when the hole O1 and the arcuate slot WW1 pass in registry to each other and in registry with the hole R2 beginning at the hole LO2, of row R2, FIG. 6, that is in the direction opposite to the movement of the shutter, thus obtaining the average speed of the shutter in a single recording operation in a distinct, easy to read, dots pattern.

FIG. 6 shows the termination of a recorded operation in which, for example, eight light dots are printed on the film, effected, as above mentioned, by the disc 32 moving in clockwise direction, which is the operating direction of the focal plane shutter, indicated by the arrow OW, under this condition four dots are to be added to the eight dots thus recorded for compensating for the negativated shutter speed, while FIG. 7 shows a recording operation terminating in a counter-clockwise direction effected by the rotation of disc 33, which is a direction against the direction of the shutter, having the effect of increasing the speed of the focal plane shutter, this effect being compensated by subtracting four light dots from the eight light dots in that row, resulting in the compensating for the direction of movement of the shutter in the manner identical to that of the recorded light dots in the rows R1 and R2, and the subtraction and addition apply irrespective of the number of dots recorded at the conclusion of a recording operation.

The outer disposed end of shaft 23 is formed with a pinion 41 engaging a gear 42 mounted on a pivot 50, screw threaded into the flange portion 13. The gear 42 carries a pin 43 provided for engaging the actuating arm of a micro-switch 44, shown in phantom line in FIGS. 2, 3 and 4, the operation of the switch being timed to cause the energization of lamp 36 simultaneously with the energization of an electromagnet, not shown, for moving its armature 45, FIG. 4, and thereby actuating the plunger 46 in the photographic apparatus, which operation being timed to occur simultaneously with the passing of the lightpath L1, FIG. 1, in registry with the light opening R1 in the screen plate and with the lightway W1, that is in registry with the row of holes at the top end of the screen plate.

According to the gearing mechanism above described, and considering the pinion 17 engaged with gear 21, the speed of the discs will produce light dots at the rate of 500 in one second, whereas the engagement of gear 16 with pinion 22 will produce light dots at the rate of 1000 in one second, but the speed of rotation of disc members 32 and 33 and the number of light holes in concentric rows in the screen plate 34 may be chosen, as above mentioned, to generate any number of light dots per second consistent with a maximum shutter's speed to be recorded.

In the present device, the speed of shutters in photographic apparatus may be recorded upon the simple operation of an ordinary manually operable switching device (not shown) serving to close the motor circuit for actuating the gearing mechanism, and thereby the disc members one turn in opposite direction to each other, while the rotation of gear 42 is effective to engage the pin 43 carried thereby with the arm of the micro-switch 44 for simultaneously energizing the lamp and the electromagnet, the armature of which actuates the plunger in the photographic apparatus for recording the speed of the shutter in term of the light dots generated by the cooperation of the screen plate, the two disc members rotating in opposite direction and the energization of the lamp, which is then followed by the opening of the motor circuit, and the device is now ready for a succeeding operation.

What I claim is:

1. A device for recording the speed of a shutter on a film in a photographic apparatus, said device comprising a lamp, a pair of concentrically disposed rotatable disc members, a screen plate disposed adjacent to one of said disc members, said screen plate having rows of holes disposed radially relative to the center of said disc members, said disc members having equally circumferentially-spaced holes and arcuate slots cooperating with each other and with the holes in said screen plate for generating and transmitting light dots from said lamp onto the film in the photographic apparatus simultaneously with the rotation of said disc members whereby when said disc members rotate in opposite direction and the shutter is tripped the film is impressed with light dots from which the shutter speed may be evaluated.

2. A device for recording the speed of a shutter on a film in a photographic apparatus, said device comprising a pair of differentially rotatable disc members disposed flatwise adjacent to each other, a stationary screen plate disposed radially in juxtaposition to one side of one of said disc members, said screen plate having concentrically disposed rows of holes, each of said disc members having arcuate slots and holes therein, the arcuate slots and the holes in said disc members registering with each other and with different rows of holes in said screen plate upon the rotation of said disc members, and a lamp for projecting light dots onto the film through the lightpaths formed by the arcuate slots and the holes in said disc members and the rows of holes in said screen plate simultaneously with the operation of said lamp, of said disc members, and of the shutter in the photographic apparatus.

3. A device for recording the speed of a shutter in an apparatus having a film therein, said device comprising a base having an upright supporting plate, a lamp and a screen plate securely mounted on said supporting plate in position adjacent to each other, a pair of disc members mounted on said supporting plate in coaxial flatwise relation and adjacent to said screen plate, a differential gearing mechanism for rotating said disc members in opposite direction to each other, a constant speed motor for actuating said gearing mechanism, said screen plate having concentrically disposed rows of holes therein, arcuate slots and holes formed in each of said disc members, the arcuate slots formed in one of said disc members registering sequentially with a number of rows of holes in said screen plate and with the holes in the other of said disc members, the arcuate slots formed in the first mentioned disc member registering sequentially with the holes of the last mentioned disc member other number of rows of holes in said screen plate upon the alternate registering of the slots in said discs for transmitting light dots onto the film in the apparatus upon the operation of said lamp and of the shutter simultaneously with the operation of said disc members in said directions by said motor.

4. A device for recording the speed of a shutter in a photographic apparatus having a film therein, said device comprising a pair of disc members disposed in coaxial and flatwise relation adjacent to each other, a differential mechanism for rotating said disc members, a screen plate disposed adjacent said disc members, said screen plate having concentrically disposed rows of holes, said disc members having a plurality of holes therein and a plurality of arcuate slots, a number of said concentrically disposed rows of holes in said screen plate registering sequentially with the holes and with the arcuate slots in one of said disc members, the other rows of holes in said screen plate registering sequentially with the holes and with the arcuate slots in the other of said disc members upon the alternate registering of the slots in said discs, and a lamp disposed adjacent said screen plate for transmitting series of light dots onto the film upon the simultaneous operation of the shutter in the photographic apparatus and the rotation of said disc members for recording the speed of the shutter in such apparatus.

5. A device for recording the speed of a shutter in a photographic apparatus having a film therein, said device comprising a lamp, a pair of disc members, means for actuating said disc members in direction opposite to each other, each of said disc members having holes and slots disposed at different distances from the center thereof, the slots in one of said disc member alternating with the slots in the other disc member, a screen plate having concentric row of holes alternatively registering with the holes and the arcuate slots in said disc members upon the rotation of the latter in said directions for projecting light dots onto the film in the photographic apparatus upon the simultaneous operation of said disc members, said lamp and shutter for indicating the speed of the latter by the number of light dots printed on the film.

6. A device for recording the speed of a shutter in a photographic apparatus having a film therein, said device comprising a mounting plate having flange members and a bearing formed therewith, a sleeve supported for rotation in said bearing, a shaft having one end fitted for rotation in said sleeve and its other end in one of said flange members, a disc member keyed on said sleeve at one end thereof, a disc member keyed on one end of said shaft, said discs disposed in flatwise adjacent relation to each other, a motor, a gearing mechanism having shafts rotatably mounted on said flange members, a differential mechanism operatively connected to said gearing mechanism for rotating said disc members in opposite direction to each other upon the operation of said motor, a screen plate carried by said mounting plate in position adjacent to said disc members, a lamp having a reflector secured to said mounting plate in position adjacent said screen plate, the latter having a plurality of concentrically disposed rows of holes, a plurality of holes and arcuate slots in said disc members registering with their respective concentrically disposed rows of holes in said screen plate for generating and transmitting light dots onto the film in the photographic apparatus upon the operation of said disc members in said directions and the operation of said lamp and of the shutter for recording the speed of the latter by the number of light dots printed on the film.

7. A device for recording the speed of a shutter in a photographic apparatus having a film therein, said device comprising a screen plate, a lamp disposed adjacent to said screen plate, a pair of rotatable disc members disposed in adjacent flatwise relation to each other, a differential mechanism for rotating said disc members in opposite direction to each other, each of said disc members having a plurality of holes and consecutive arcuate slots of equal angular extent uniformly spaced at different distances from the center thereof, the holes in one disc member alternating with the slots in the other of said disc members in said pair and the holes in said other of said disc members registering with the slots in the first mentioned disc member and the rows of holes and slots of both disc members registering with the rows of holes in said screen plate for projecting light dots onto the film in the photographic apparatus upon the operation of the shutter simultaneously with the rotation of both of said disc members and the operation of said lamp for recording the speed of the shutter by the number of light dots projected onto the film.

References Cited in the file of this patent

UNITED STATES PATENTS

| | | |
|---|---|---|
| 808,384 | Kershaw | Dec. 26, 1905 |
| 2,137,963 | Heiland | Nov. 22, 1938 |

OTHER REFERENCES

"A Method of Testing Focal Plane Shutters," pages 241–249, in The American Annual of Photography, 1936, J. L. Sheldon.